Mar. 27, 1923.
A. S. WALLACE
TIRE TOOL
Filed Mar. 12, 1919
1,449,466
2 sheets-sheet 1
Fig. 1
Fig. 2
Fig. 3
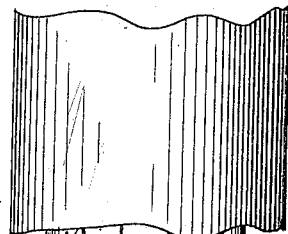
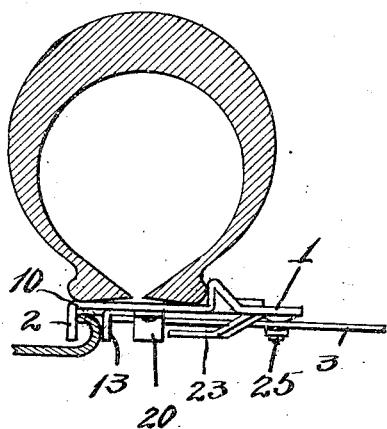
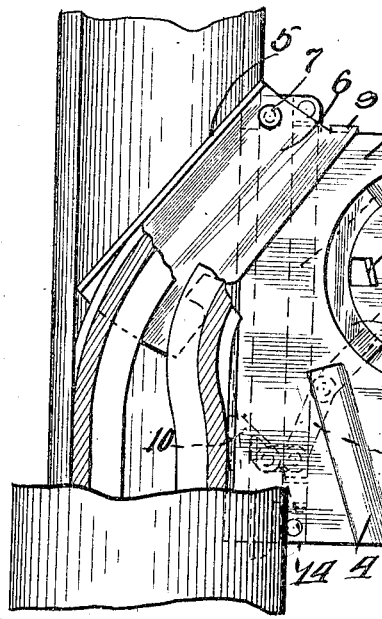
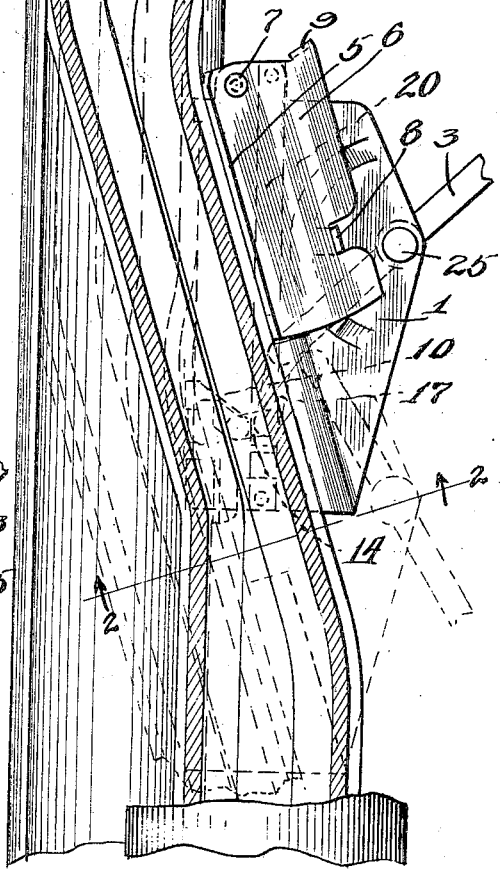
Witnesses
J. W. Angell
Charles W. Hill Jr.
Inventor
Albert S. Wallace
by Charles W. Hill
Atty

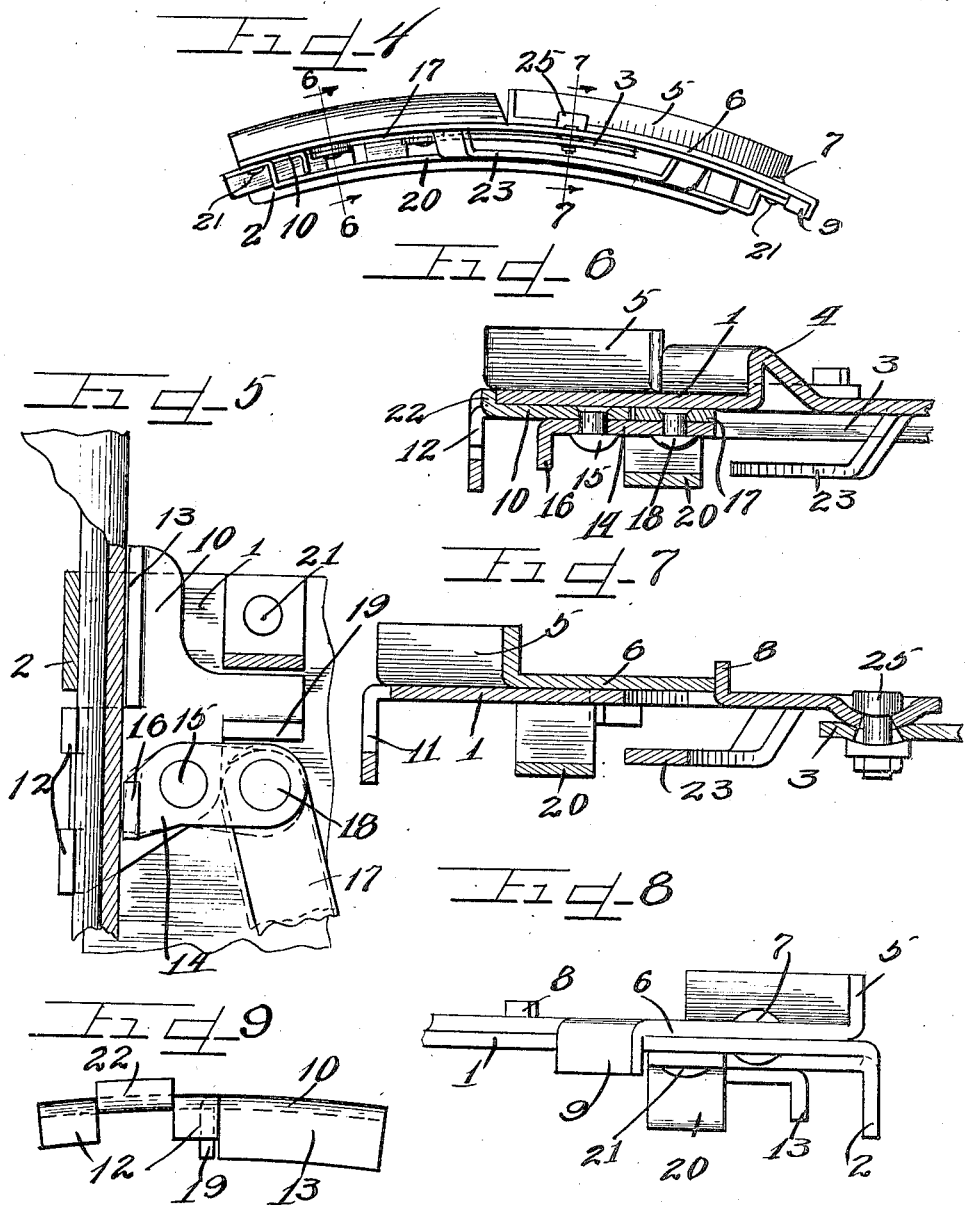

Patented Mar. 27, 1923.

1,449,466

UNITED STATES PATENT OFFICE.

ALBERT S. WALLACE, OF CHICAGO, ILLINOIS.

TIRE TOOL.

Application filed March 12, 1919. Serial No. 282,125.

*To all whom it may concern:*

Be it known that I, ALBERT S. WALLACE, a citizen of the United States, and a resident of the city of Chicago, in the county of Cook and State of Illinois, have invented certain new and useful Improvements in a Tire Tool, of which the following is a full, clear, and exact description, reference being had to the accompanying drawings, and the numerals of reference marked thereon, which form a part of this specification.

This invention relates to tire tools adapted for aiding in the changing of pneumatic tires and although not limited to such use, it is particularly adapted for use with automobiles having fixed non-demountable rims.

A tire may be readily placed with one part in position on a wheel rim, but as a greater and greater length of tire is brought into position the operation becomes progressively more difficult. This operation is ordinarily carried out by means of levers of some kind, and either the lever must be slid along the rim, pushing the tire into place, which is an awkward operation, or else the lever must be pulled out and re-inserted further along the rim. The latter procedure usually requires the use of two levers: one being used to prevent the tire slipping off the rim again, while the other is being re-inserted further along the rim. Similar troubles are experienced in detaching a tire from the wheel.

My invention is particularly designed to obviate this difficulty.

It is an object, therefore, of my invention to provide a device which may be inserted under a tire at one point and then quickly and easily moved progressively around the rim of the wheel, to push the tire completely on or completely off the rim.

My invention also has other and further important objects which will be apparent from the disclosures in the specification and drawings.

My invention (in a preferred form) is illustrated in the drawings and hereinafter more fully described.

On the drawings:

Figure 1 is a plan view, partly in section, of a tire being placed on a rim by means of a tool embodying my invention.

Figure 2 is a section on the line 2—2, of Fig. 1.

Figure 3 is a plan view partly in section of a tire being removed by means of the tool.

Figure 4 is a side elevation of the tool.

Figure 5 is a face view of the underside of a portion of the tool.

Figure 6 is a section on the line 6—6, of Figure 4.

Figure 7 is a section on the line 7—7, of Figure 4.

Figure 8 is an end view of the tool.

Figure 9 is a side view of one part of the tool.

As shown on the drawings:—

The tool comprises a plate 1, having a flange 2, along one margin adapted to engage the inner side of one edge of the wheel rim, as shown more particularly in Fig. 2. The plate 1, is curved longitudinally to substantially the same extent as the rim of an automobile wheel of ordinary size, so that this plate will contact with the rim throughout substantially its entire length.

Suitable guide surfaces are arranged on the upper side of the plate 1, for engagement with the edge of the tire so that by progressively moving the plate along the rim by an oscillating operating handle or lever 3, pivotally attached to the plate 1, at 25, the tire may be put on or taken off the rim as desired. These guide surfaces include a ridge or shoulder 4, conveniently formed by stamping upwardly a section of the plate 1, and an upstanding flange 5, on a plate 6, pivotally secured to the plate 1, by a pin 7. When it is desired to place a tire on the wheel, the plate 6, is swung about pivot 7, to bring its flanged edge in line with the shoulder 4, on the plate 1, so as to form a continuous guide surface as shown in Figure 1. Further rearward movement of the plate 6, is prevented by suitable means, such as the projection 8, formed by slitting and bending upwardly a portion of the plate 1.

As the tool is arranged so that it can be moved around the rim in one direction only by means of the lever 3, means are provided for changing the angular relation of one of the guide surfaces relatively to the tire, so that the tire may be forced off the rim, instead of being forced onto the rim. This is accomplished by swinging the plate 6 around so as to enable its flanged edge 5, to engage with the outer edge of the opposite bead of the tire, as shown more particularly in Figure 3. The plate 6, is held in this position relatively to the plate 1, by means of a downwardly extending projection 9, adapted to engage the end of the plate 1.

In order that the tool may be moved around the tire by means of the lever 3, a dog 10 is provided for releasable locking engagement with the wheel rim. To enable this dog properly to engage with the edge of the rim, the upper part of the flange 2, and a part of the plate 1, adjacent thereto, is cut away as shown in Figure 7, throughout the greater part of the length of such flange to form a slot 11. Within the slot so formed the dog 10, can be moved by the operation of the lever 3. The dog 10, is provided at one end with a pair of downwardly extending projections 12, adapted to engage the inner side of the edge of the rim, and adjacent its other end with a downwardly extending projection 13, for engagement with the outer side of the edge of the rim. Sufficient space is allowed laterally between the projections 12 and 13, to allow the dog to slide freely along the rim in either direction.

For releasably locking the dog to the rim a gripper or catch 14, is provided which is pivotally connected to the dog at 15. This catch is provided with a downwardly extending projection 16, adapted to engage the outer face of the edge of the wheel rim, when moved into the position shown in dotted lines in Figure 5. To the outer end of the catch 14, a comparatively short link 17, is pivotally connected at 18. The other end of this link is similarly pivotally connected to the inner end of the lever 3. Oscillation of the catch 14 about its pivot 15, is limited in one direction by the engagement of the projection 16, with the rim and in the opposite direction by contact of the opposite end of the catch with a downwardly extending projection 19, on the dog 10.

This catch 14, being pivotally attached to the dog 10, and having attached to its outer end the link 17, which in turn is connected to one end of the lever or handle 3, will move the dog 10 in either direction in its slot in the plate 1 upon a proper movement of the lever 3 but when applied to a rim, movement of the lever 3 in one direction will act to lock the dog 10 on the rim by means of the coaction between the catch 14, the rim, and the downwardly projecting lugs 12 whereupon the plate 1 together with its attached flanged plate 6 will be constrained to move, thereby acting on the tire. However upon a reverse movement of the lever 3 the catch 14 will be pushed forward by the link 17 and its lug 16 will move away from the rim into the position shown in Fig. 5, whereupon the gripping action of the catch 14 and dog 10 upon the rim will be discontinued and their parts will move forward into a new position.

With the parts in the position shown in Figure 1, it will be seen that by pulling the lever 3 downwardly, the projection 16 is brought into contact with the rim so as to clamp the latter firmly against the projections 12. When that has been accomplished further movement of the lever can only result in moving the plate 1 relatively to the dog 10, which, for the time being, remains locked in engagement with the wheel rim. This operation of the lever 3 will move the tool into the position shown in dotted lines in Figure 1. When that position has been reached the lever 3 is moved upwardly again. This upward movement of the lever 3 immediately brings the catch 14 into the position shown in full lines in Figure 5. In this position, the dog is free to slide along the rim, relatively to the plate 1, so as to bring it into position for a second forward movement of the plate. The friction of the flange 2 against the rim is sufficient to prevent the tool slipping back while the dog is is being moved rearwardly.

For retaining the dog 10 and its associated parts in position relatively to the plate 1, a guide 20 is arranged underneath these parts and is secured to the plate 1, at its ends by rivets 21.

The dog 10, is further guided in its to and fro movement by means of a projection 22, formed by bending upwardly the intervening metal between the projections 12—12. This projection 22, engages the outer edge of the plate 1, as shown in Figure 6. A pair of limiting end stops have also been provided for the lever 3 by striking tongues or lugs from the plate 1 upon the ends of an arcuate slot 23.

The operation is as follows:

Assuming it is desired to place a tire on a wheel, one part of the tire is placed with its edges within the rim and the tool placed in engagement with the edge of the rim adjacent that point. The lever 3, is then oscillated to and fro to move the tool progressively around the rim until the whole tire has been brought into engagement with the wheel. When this has been accomplished the tool is lifted to bring the flange 2, and the projections 12, of the dog 10, out of engagement with the rim so that the tool may be removed.

For detaching a tire one portion of the tire is raised sufficiently to allow the plate 6, to be slid thereunder so as to bring its flange 5 into engagement with the opposite bead of the tire. When this has been accomplished, the plate 1, is moved progressively around the wheel, as before, until the tire has been completely detached from the wheel.

I am aware that numerous details of construction may be varied through a wide range without departing from the principles of my invention and I therefore do not purpose limiting the patent granted further than necessitated by the prior art.

I claim as my invention:

1. A tire tool comprising a curved plate, a flange along one margin adapted to engage the inner face of one edge of a wheel rim, means for releasably gripping said edge, said means being slidable relatively to the plate in a cutaway part in said flange, a handle pivotally connected to the plate for moving the latter relatively to the gripping means and to thereby move the tool progressively around the wheel, and a guide surface on said plate adapted to engage the bead of a tire.

2. A tire tool comprising a member adapted to engage and slide along the edge of a wheel rim, a rim gripping device freely slidable relatively to said member in both directions, said device being adapted also to slide freely along the rim in one direction only and to grip the latter if moved in the other direction, means for moving said member and said gripping device along said rim in alternation and thereby move the tool progressively around the wheel, and a guide surface on said member adapted to engage the bead of a tire.

3. A tire tool comprising a curved plate, a flange along one margin adapted to engage the inner face of one edge of a wheel rim, means for releasably gripping said edge, said means being slidable relatively to the plate in a slot in said flange, a handle pivotally connected to the plate and to said means for moving the plate relatively to said means and thereby moving the tool progressively around the wheel, and a second plate pivoted to the first plate having a double guide surface thereon having one side adapted to engage the adjacent bead of a tire to apply the same and with its other side adapted to engage the opposite bead of the tire for removal of same.

4. A combined tire setter and remover comprising a member adapted to be supported on the rim of a wheel, and a flanged plate, pivoted to said member, and swingable to inclined position for engaging either side of a tire, means for limiting the swinging movement of said plate, and means for intermittently advancing said member around the rim of the wheel.

5. A combined tire setter and remover comprising a member adapted to be supported on the rim of a wheel, a tire engaging device adjustably mounted thereon for engaging either side of a tire, a lever pivoted to said member, gripping mechanism adapted for intermittently engaging the rim of said wheel and means connecting said mechanism and lever.

6. A combined tire setter and remover comprising a member supported for circumferential movement on the rim of a wheel, a device on said member for setting or removing a tire, a lever pivoted to said member, and gripping mechanism connected to said lever for anchoring one end of said lever against movement in one direction.

7. A tire setter and remover comprising a member adapted to be supported for circumferential movement on the rim of a wheel, a tire engaging device pivoted at one end upon said member and adjustable to inclined positions for engaging either side of a tire, means for retaining said device in such inclined positions, a lever pivoted to said member, grippers engaging the rim of the wheel and connected to said lever for anchoring one end of said lever against movement in one direction.

In testimony whereof I have hereunto subscribed my name in the presence of two subscribing witnesses.

ALBERT S. WALLACE.

Witnesses:
 EARL M. HARDINE,
 FRED E. PAESLER.